US010698622B2

(12) United States Patent
Avraham et al.

(10) Patent No.: US 10,698,622 B2
(45) Date of Patent: Jun. 30, 2020

(54) MAINTAINING CONTAINER TO STORAGE VOLUME RELATIONS

(71) Applicant: International Business Machines Corporation, Armonk, NY (US)

(72) Inventors: Amalia Avraham, Petach Tikva (IL); Alon Marx, Matan (IL); Isaac Beckman, Lehavim (IL); Lior Tamary, Omer (IL)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 15/986,706

(22) Filed: May 22, 2018

(65) Prior Publication Data

US 2019/0361618 A1 Nov. 28, 2019

(51) Int. Cl.

*G06F 9/455* (2018.01)
*G06F 3/06* (2006.01)

(52) U.S. Cl.

CPC .......... *G06F 3/0631* (2013.01); *G06F 3/0604* (2013.01); *G06F 3/067* (2013.01); *G06F 3/0665* (2013.01); *G06F 9/45558* (2013.01); *G06F 2009/45583* (2013.01); *G06F 2009/45595* (2013.01)

(58) Field of Classification Search

None
See application file for complete search history.

(56) References Cited

U.S. PATENT DOCUMENTS

| | | | | |
|---|---|---|---|---|
| 7,640,416 | B2 | 12/2009 | Sarkar et al. | |
| 7,702,866 | B2 | 4/2010 | Beardsley et al. | |
| 9,678,683 | B1 | 6/2017 | Chen | |
| 2014/0047341 | A1* | 2/2014 | Breternitz | G06F 9/505 715/735 |
| 2015/0186520 | A1* | 7/2015 | Guo | G06F 16/1748 707/770 |
| 2016/0248640 | A1* | 8/2016 | Simoncelli | H04L 41/5054 |
| 2017/0242617 | A1* | 8/2017 | Walsh | G06F 3/0644 |
| 2018/0121242 | A1* | 5/2018 | Zhang | G06F 9/50 |
| 2018/0181436 | A1* | 6/2018 | Chen | G06F 9/461 |
| 2018/0336079 | A1* | 11/2018 | Soman | G06F 9/45504 |
| 2018/0375936 | A1* | 12/2018 | Chirammal | H04L 67/1097 |
| 2019/0163388 | A1* | 5/2019 | Chen | G06F 3/0604 |

(Continued)

OTHER PUBLICATIONS

Mohamed et al., "Ubiquity: Extensible Persistence as a Service for Heterogeneous Container-Based Frameworks,"OTM Confederated International Conferences on the Move to Meaningful Internet Systems, 2017, pp. 716-731.

(Continued)

*Primary Examiner* — Kaushikkumar M Patel
(74) *Attorney, Agent, or Firm* — Zilka-Kotab, P.C.

(57) ABSTRACT

A computer-implemented method according to one embodiment includes receiving, at a storage system, a request to allocate persistent data storage for use by a container within an orchestration system, where the request includes an orchestration system identifier, selecting a storage volume within the storage system for use by the container within the orchestration system, determining a storage identifier for the storage volume within the storage system, and storing, within the storage system, an association between the orchestration system identifier and the storage identifier.

18 Claims, 9 Drawing Sheets

(56) References Cited

U.S. PATENT DOCUMENTS

| | | | | |
|---|---|---|---|---|
| 2019/0179530 | A1* | 6/2019 | Chen | G06F 3/0631 |
| 2019/0213086 | A1* | 7/2019 | Vallala | G06F 16/128 |

OTHER PUBLICATIONS

NIST, "NIST Cloud Computing Program," Information Technology Laboratory, retrieved from http://www.nist.gov/itl/cloud/, Nov. 2013, pp. 1-2.

Mell et al., "The NIST Definition of Cloud Computing," Version 15, Oct. 2009, pp. 1-2.

Mell et al., "The NIST Definition of Cloud Computing," National Institute of Standards and Technology, Special Publication 800-145, Sep. 2011, pp. 1-7.

* cited by examiner

MAINTAINING CONTAINER TO STORAGE VOLUME RELATIONS

BACKGROUND

The present invention relates to data storage and container implementation management, and more specifically, this invention relates to implementing persistent storage for a container, utilizing a storage system.

Containers have changed how applications are deployed, and their integration is on the rise. Part of the benefit of containers is their temporary or transient nature. A container may be spun up in seconds, used just as long as necessary, and then terminated with the minimum overhead on system resources. This ethereal nature also applies to the data within the container itself. There is therefore a need to enable reliable persistent storage for use with non-persistent containers.

SUMMARY

A computer-implemented method according to one embodiment includes receiving, at a storage system, a request to allocate persistent data storage for use by a container within an orchestration system, where the request includes an orchestration system identifier, selecting a storage volume within the storage system for use by the container within the orchestration system, determining a storage identifier for the storage volume within the storage system, and storing, within the storage system, an association between the orchestration system identifier and the storage identifier.

According to another embodiment, a computer program product for maintaining container to storage volume relations comprises a computer readable storage medium having program instructions embodied therewith, where the computer readable storage medium is not a transitory signal per se, and where the program instructions are executable by a processor to cause the processor to perform a method comprising receiving, utilizing the processor at a storage system, a request to allocate persistent data storage for use by a container within an orchestration system, where the request includes an orchestration system identifier, selecting, utilizing the processor, a storage volume within the storage system for use by the container within the orchestration system, determining, utilizing the processor, a storage identifier for the storage volume within the storage system, and storing, within the storage system, an association between the orchestration system identifier and the storage identifier, utilizing the processor.

A system according to another embodiment comprises a processor, and logic integrated with the processor, executable by the processor, or integrated with and executable by the processor, where the logic is configured to receive, at a storage system, a request to allocate persistent data storage for use by a container within an orchestration system, where the request includes an orchestration system identifier, select a storage volume within the storage system for use by the container within the orchestration system, determine a storage identifier for the storage volume within the storage system, and store, within the storage system, an association between the orchestration system identifier and the storage identifier.

Other aspects and embodiments of the present invention will become apparent from the following detailed description, which, when taken in conjunction with the drawings, illustrate by way of example the principles of the invention.

DETAILED DESCRIPTION

Figure 1:
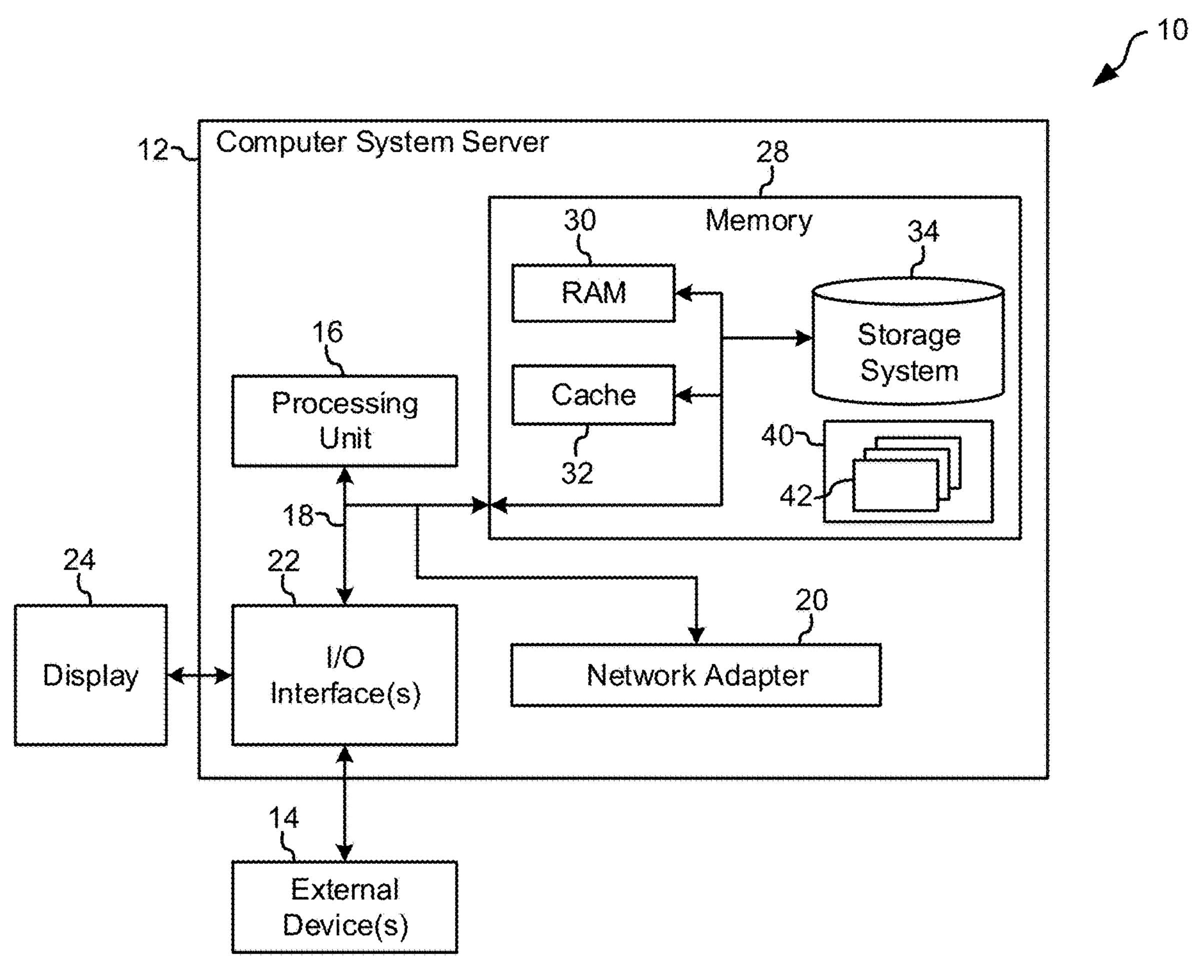
FIG. 1 depicts a cloud computing node according to an embodiment of the present invention.

The following description discloses several preferred embodiments of systems, methods and computer program products for maintaining container to storage volume relations. Various embodiments provide a method for mapping storage volume identifiers to orchestration system identifiers, and storing the mapping at a persistent storage system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for maintaining container to storage volume relations.

In one general embodiment, a computer-implemented method includes receiving, at a storage system, a request to allocate persistent data storage for use by a container within an orchestration system, where the request includes an orchestration system identifier, selecting a storage volume within the storage system for use by the container within the orchestration system, determining a storage identifier for the storage volume within the storage system, and storing, within the storage system, an association between the orchestration system identifier and the storage identifier.

In another general embodiment, a computer program product for maintaining container to storage volume relations comprises a computer readable storage medium having program instructions embodied therewith, where the computer readable storage medium is not a transitory signal per se, and where the program instructions are executable by a processor to cause the processor to perform a method comprising receiving, utilizing the processor at a storage system, a request to allocate persistent data storage for use by a container within an orchestration system, where the request includes an orchestration system identifier, selecting, utilizing the processor, a storage volume within the storage system for use by the container within the orchestration system, determining, utilizing the processor, a storage identifier for the storage volume within the storage system, and storing, within the storage system, an association between the orchestration system identifier and the storage identifier, utilizing the processor.

In another general embodiment, a system comprises a processor, and logic integrated with the processor, executable by the processor, or integrated with and executable by the processor, where the logic is configured to receive, at a storage system, a request to allocate persistent data storage for use by a container within an orchestration system, where the request includes an orchestration system identifier, select a storage volume within the storage system for use by the container within the orchestration system, determine a storage identifier for the storage volume within the storage system, and store, within the storage system, an association between the orchestration system identifier and the storage identifier.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing and storage resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
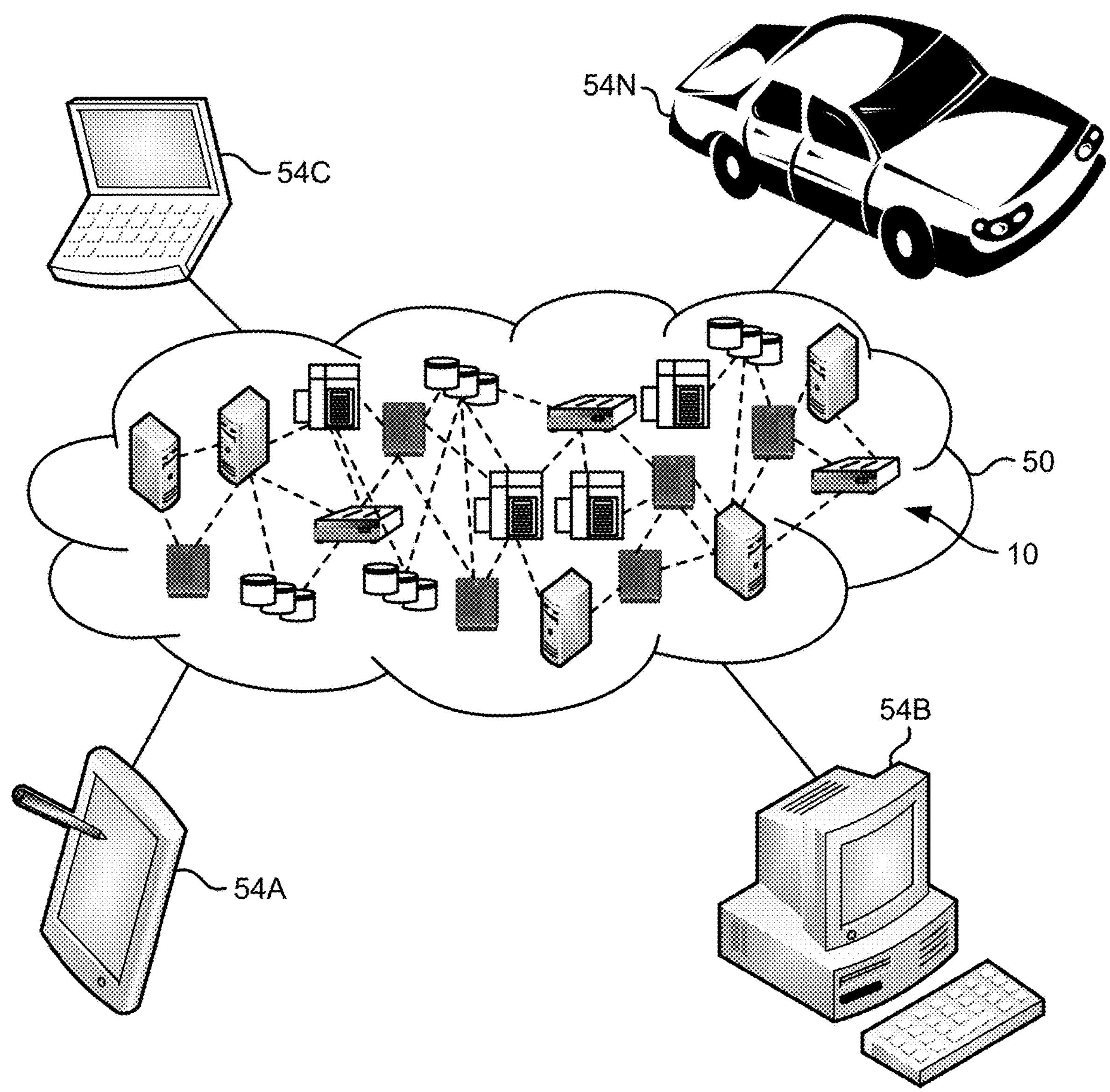
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
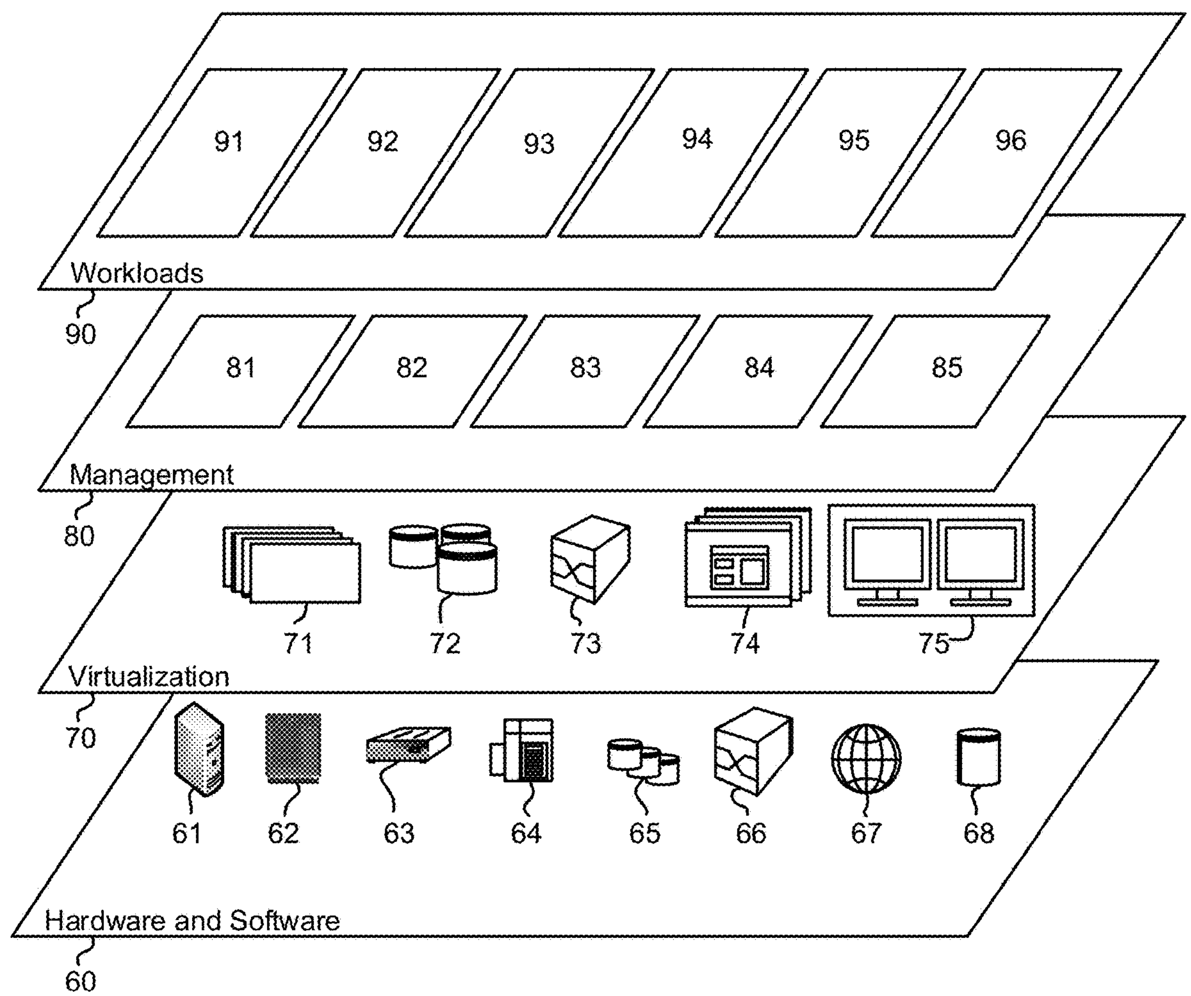
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
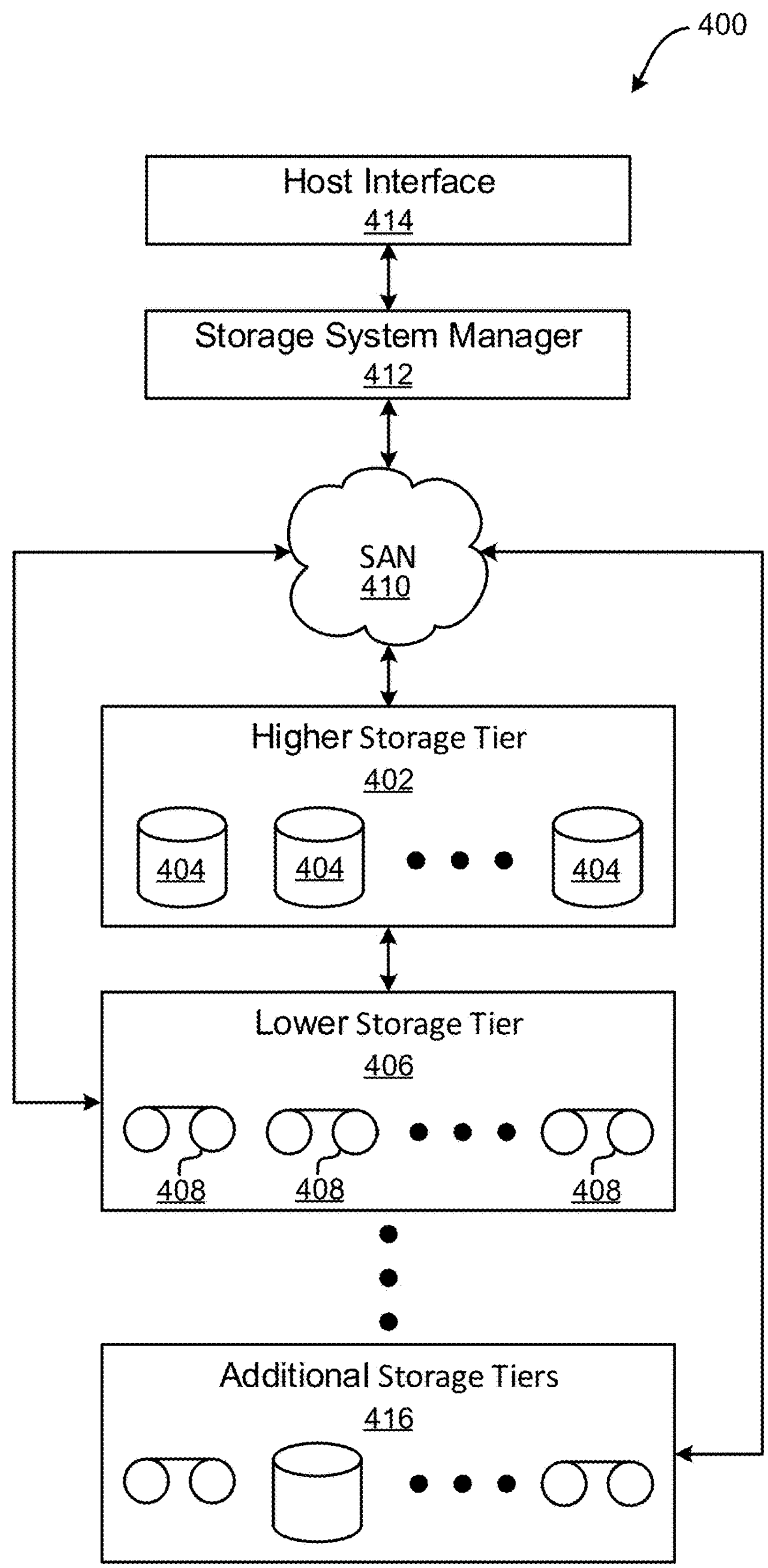
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems or other storage system managers (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
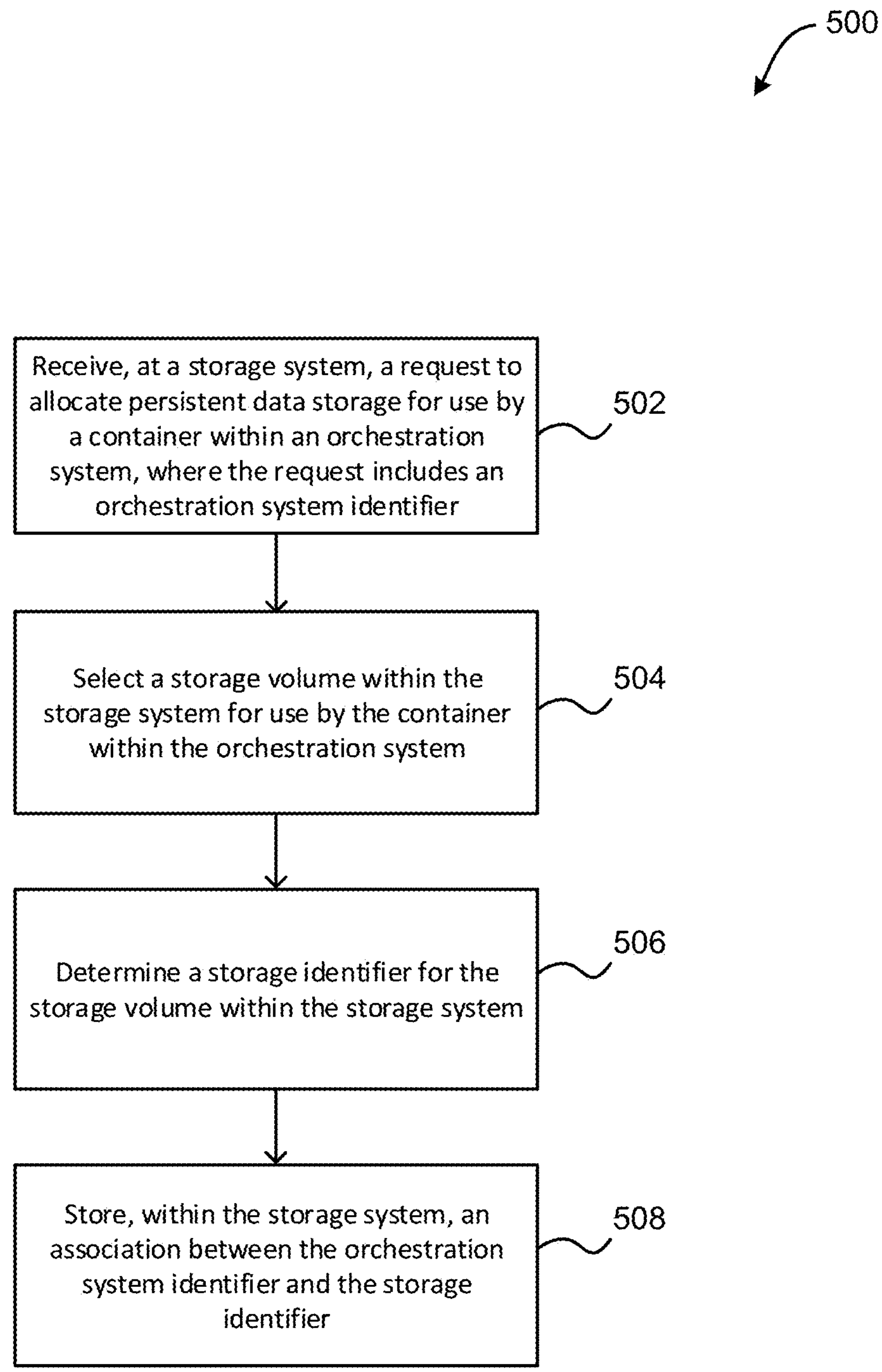
FIG. 5 illustrates a flowchart of a method for maintaining container to storage volume relations, in accordance with one embodiment.

Now referring to FIG. 5, a flowchart of a method 500 is shown according to one embodiment. The method 500 may be performed in accordance with the present invention in any of the environments depicted in FIGS. 1-4 and 8-9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request to allocate persistent data storage for use by a container within an orchestration system is received at a storage system, where the request includes an orchestration system identifier. In one embodiment, the storage system may include a distributed storage environment. For example, the distributed storage environment may include one or more storage devices (e.g., servers, computers, etc.). In another example, the distributed storage environment may include one or more storage drives (e.g., hard disk drives, solid state memory drives, tape drives, etc.). In yet another example, the devices and/or storage drives may be connected utilizing one or more communication networks.

Additionally, in one embodiment, the storage system may include a plurality of storage volumes. In another embodiment, each of the plurality of storage volumes may include a storage device, a storage drive, a predetermined portion of a storage drive (e.g., one or more predetermined tracks of a storage drive, etc.). In yet another embodiment, the orchestration system may include a container implementation environment. In still another embodiment, the storage system may provide the persistent data storage via the plurality of storage volumes.

Further, in one embodiment, the orchestration system may be implemented within a cloud computing environment. In another embodiment, the orchestration system may include a plurality of nodes that are used to implement containers. In yet another embodiment, the orchestration system may control the implementation and running of one or more containers. For example, the orchestration system may implement and run one or more containers based on stored container images.

Further still, in one embodiment, the container may include a containerized application, which may include a standalone executable instance of an application. In another embodiment, the container may be non-persistent. In yet another embodiment, the container may include application code, a runtime for the application, one or more system tools, libraries, settings, etc. In still another embodiment, the request to allocate persistent data may be sent from the orchestration system in response to a request associated with a container.

Also, in one embodiment, the request to allocate the persistent data may originate with an application running within a container of the orchestration system. For example, a container may first be implemented within the orchestration system. A storage claim may then be created/issued within the container. In one embodiment, the storage claim may include a request for persistent storage for use by the container (e.g., to store data created by the container, etc.). In another embodiment, the storage claim may be manually initiated, or may be automatically initiated by the container. In yet another embodiment, the storage claim may include a persistent volume claim (PVC). In still another embodiment, the storage claim may identify a predetermined amount of persistent data that is needed by the container within the orchestration system (e.g., a predetermined number of storage volumes, a predetermined size of data storage, etc.).

In addition, in one embodiment, the orchestration system identifier may be created within the container, in response to the storage claim. For example, the orchestration system identifier may include an identifier of the persistent volume claim (e.g., a PVC ID, etc.). In another example, the orchestration system identifier may include an identifier of the container. In yet another example, the orchestration system identifier may identify persistent data used within the orchestration system. For instance, the persistent data may be stored within the storage system, and not the orchestration system. In another example, the persistent data may be accessed within the orchestration system, utilizing the orchestration system identifier.

Furthermore, in one embodiment, the request to allocate persistent data storage may include a request to write data to the persistent data storage. In another embodiment, in response to the creation of the storage claim, a request may be sent from the orchestration system to the storage system. For example, the request may identify a predetermined amount of persistent data storage that is needed by the container within the orchestration system (e.g., a predetermined number of storage volumes, a predetermined size of data storage, etc.). In another example, the request may include the orchestration system identifier that will be used by the container to refer to/manage the requested persistent data storage within the orchestration system.

Further still, method 500 may proceed with operation 504, where a storage volume is selected within the storage system for use by the container within the orchestration system. In one embodiment, the storage volume may be automatically identified and selected by the storage system (e.g., based on available persistent storage volumes within storage environment, characteristics of the container, etc.). In another embodiment, the storage volume may be selected in response to the request to allocate the persistent data storage for use by the container within the orchestration system. In yet another embodiment, the storage volume may be selected to provide the persistent data storage by persistently storing data created within the orchestration system (e.g., by the container of the orchestration system, etc.).

Also, method 500 may proceed with operation 506, where a storage identifier for the storage volume is determined within the storage system. In one embodiment, the storage identifier may include a world wide name (WWN) or world wide identifier (WWID). In another embodiment, the storage identifier may identify a location of the storage volume within the storage system. In yet another embodiment, the storage identifier may identify a network address of the storage volume within the storage system.

Additionally, in one embodiment, the storage identifier may be used to identify and access the storage volume within the storage system. In another embodiment, the storage identifier may enable direct access of predetermined persistent data storage of the storage volume within the storage system. In yet another embodiment, the storage identifier may be automatically determined by the storage system in response to the selection of the storage volume by the storage system.

Further, in one embodiment, the storage identifier may be retrieved from metadata of the storage volume. In another embodiment, the storage identifier may be returned to the container within the orchestration system, in response to the determining.

Further still, method 500 may proceed with operation 508, where an association between the orchestration system identifier and the storage identifier is stored within the storage system. In one embodiment, the association between the orchestration system identifier and the storage identifier may be stored as a mapping. For example, the orchestration system identifier and the storage identifier may be linked within the mapping.

Also, in one embodiment, the association may be stored within one or more storage volumes within the storage system. For example, the association may be entered into a table stored within one or more storage volumes within the storage system. In another example, the table may include a plurality of different mappings between various orchestration system identifiers and various associated storage identifiers.

In addition, in one embodiment, the association may be stored within a predetermined storage volume within the storage system. For example, a single storage volume may be selected by the storage system to act as a central repository and store all mappings between orchestration system identifiers of one or more orchestration systems and storage identifiers. In another example, the association may be stored as a mapping within the selected single storage volume.

Furthermore, in one embodiment, the association may be stored as metadata within the storage volume. For example, the orchestration system identifier and/or the mapping may be stored as metadata within a predetermined portion (e.g., a metadata storage portion, etc.) of the storage volume. In another embodiment, data created at the container may also be stored at the storage volume. For example, the container may request to write data from the container to the persistent data storage, where the request includes the storage identifier. In another example, the data may be written to the storage volume, in response to the request.

Further still, in one embodiment, the storage system may provide the persistent data storage for use by the container within the orchestration system. In another embodiment, the persistent data storage may include data storage that stores data even after a container that creates/modifies such data has terminated within the orchestration system. For example, the container may be instantiated within the orchestration system. The container may create and store data at the persistent data storage, utilizing the storage identifier.

For instance, the container may send the request to create and store data at the persistent data storage, as well as the storage identifier, to the storage system. The orchestration system identifier may identify/reference the stored data for use within the orchestration system. The storage identifier may identify a physical location of the stored data at a storage volume within the persistent data storage of the storage system.

Also, in one embodiment, the container may then be terminated within the orchestration system. In another embodiment, the container may be restarted within the orchestration system. For example, the container may be restarted on the same node it was originally instantiated on within the orchestration system. In another example, the container may be restarted on a different node from the one it was originally instantiated on within the orchestration system.

Additionally, in one embodiment, the container may retrieve the storage identifier mapped to the orchestration system identifier. The container may then use the storage identifier to match the storage volume to the orchestration system identifier used by the container. In another embodiment, the container may access, retrieve, edit, and add to the data created and stored by the container at the persistent data storage, utilizing the retrieved storage identifier.

For example, the container may use the storage identifier to identify and retrieve the stored data at the persistent data storage for use within the container. In another example, the container may cache the received storage identifier for current and later use. In yet another example, the storage identifier may be used to identify and access the storage volume within the storage system that stores, at the persistent data storage, the data created by a previously created container.

In this way, the association between the orchestration system identifier and the storage identifier may be stored in persistent data within the storage system, and may be used to enable persistent data storage for non-persistent containers running within the orchestration system.

Additionally, the association between the orchestration system identifier and the storage identifier may be retained even if the container crashes or otherwise terminates within the orchestration system. Further, storage of the association between the orchestration system identifier and the storage identifier may be removed from the container within the orchestration system. This may reduce an amount of data needed to be stored by the container, and may enable to container to recover persistent data after a crash/termination of the container, which may improve a recovery performance (and an overall performance) of the container within the orchestration system (and may improve the performance of one or more hardware systems implementing the orchestration system).

Further still, by storing the association between the orchestration system identifier and the storage identifier at the storage system, fewer actions and I/O operations may need to be performed by the storage system and the orchestration system in order to retrieve and store persistent data associated with containers within the orchestration system. This may improve a performance of the storage system and the orchestration system (and may improve the performance of one or more hardware components implementing the storage system and orchestration system).

Figure 6:
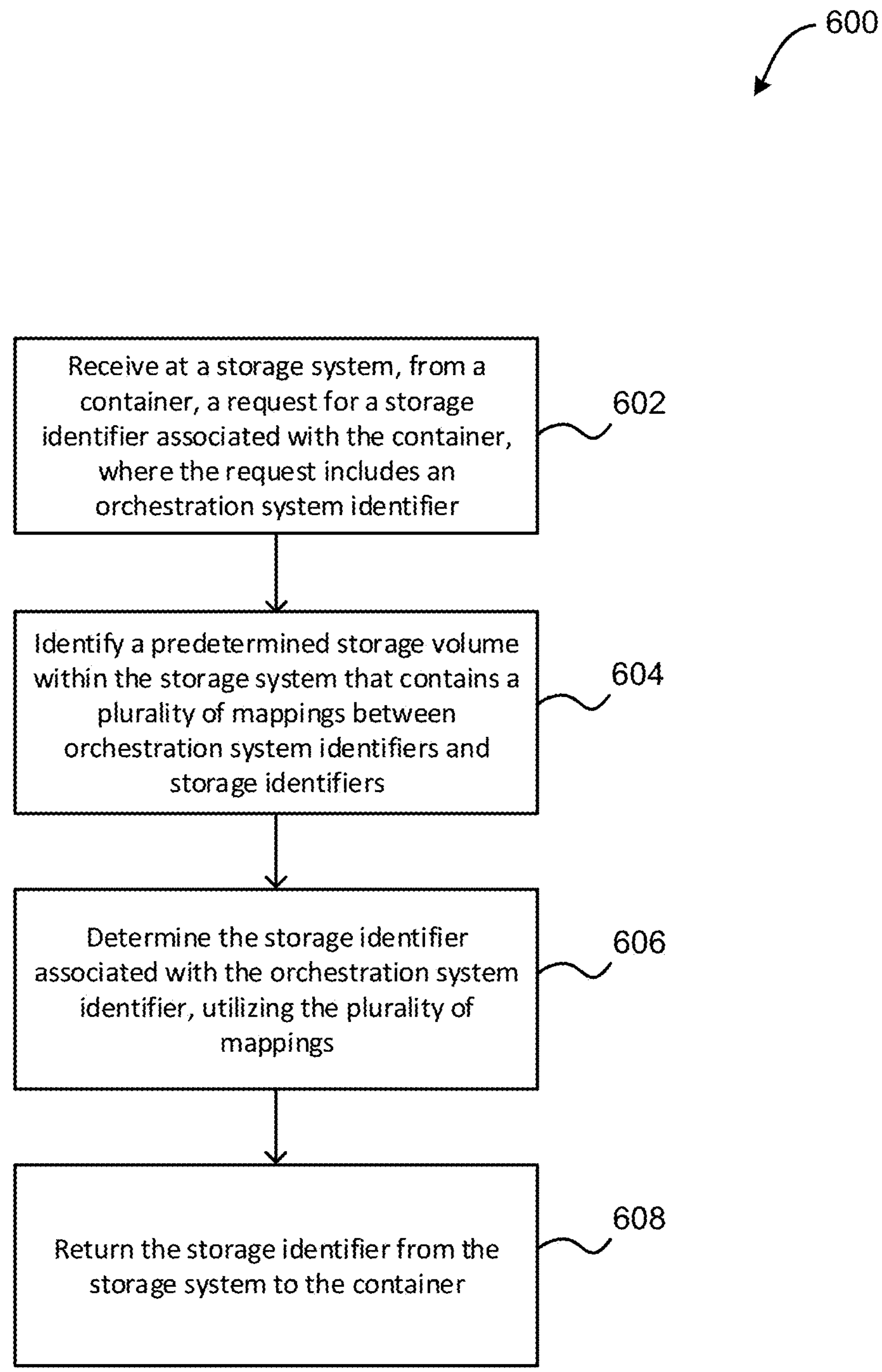
FIG. 6 illustrates a flowchart of a method for retrieving storage identifier data via mappings stored at centralized volume, in accordance with one embodiment.

Now referring to FIG. 6, a flowchart of a method 600 for retrieving storage identifier data via mappings stored at centralized volume is shown according to one embodiment. The method 600 may be performed in accordance with the present invention in any of the environments depicted in FIGS. 1-4 and 8-9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request for a storage identifier associated with a container is received from the container at a storage system, where the request includes the orchestration system identifier. In one embodiment, the container may be located within an orchestration system.

Additionally, method 600 may proceed with operation 604, where a predetermined storage volume that contains a plurality of mappings between orchestration system identifiers and storage identifiers is identified within the storage system. In one embodiment, the predetermined storage volume may include a designated metadata volume within the storage system. In another embodiment, the metadata volume may store one or more tables that include the plurality of mappings.

Further, method 600 may proceed with operation 606, where the storage identifier associated with the orchestration system identifier is determined, utilizing the plurality of mappings. In one embodiment, the orchestration system identifier may be identified within the one or more tables. In another embodiment, a storage identifier mapped to the orchestration system identifier may be identified within the metadata volume.

Further still, method 600 may proceed with operation 608, where the storage identifier is returned from the storage system to the container. In one embodiment, the requesting container may use the storage identifier to match the storage volume to the orchestration system identifier used by the container within the orchestration system. In another embodiment, the storage identifier may be used by the requesting container to retrieve persistently stored data from the storage volume of the storage system.

Also, in one embodiment, the storage volume may be identified and accessed, utilizing the storage identifier. In another embodiment, the persistently stored data may be requested from the identified storage volume, utilizing the storage identifier. In yet another embodiment, the persistently stored data may be returned to the container of the orchestration system.

Figure 7:
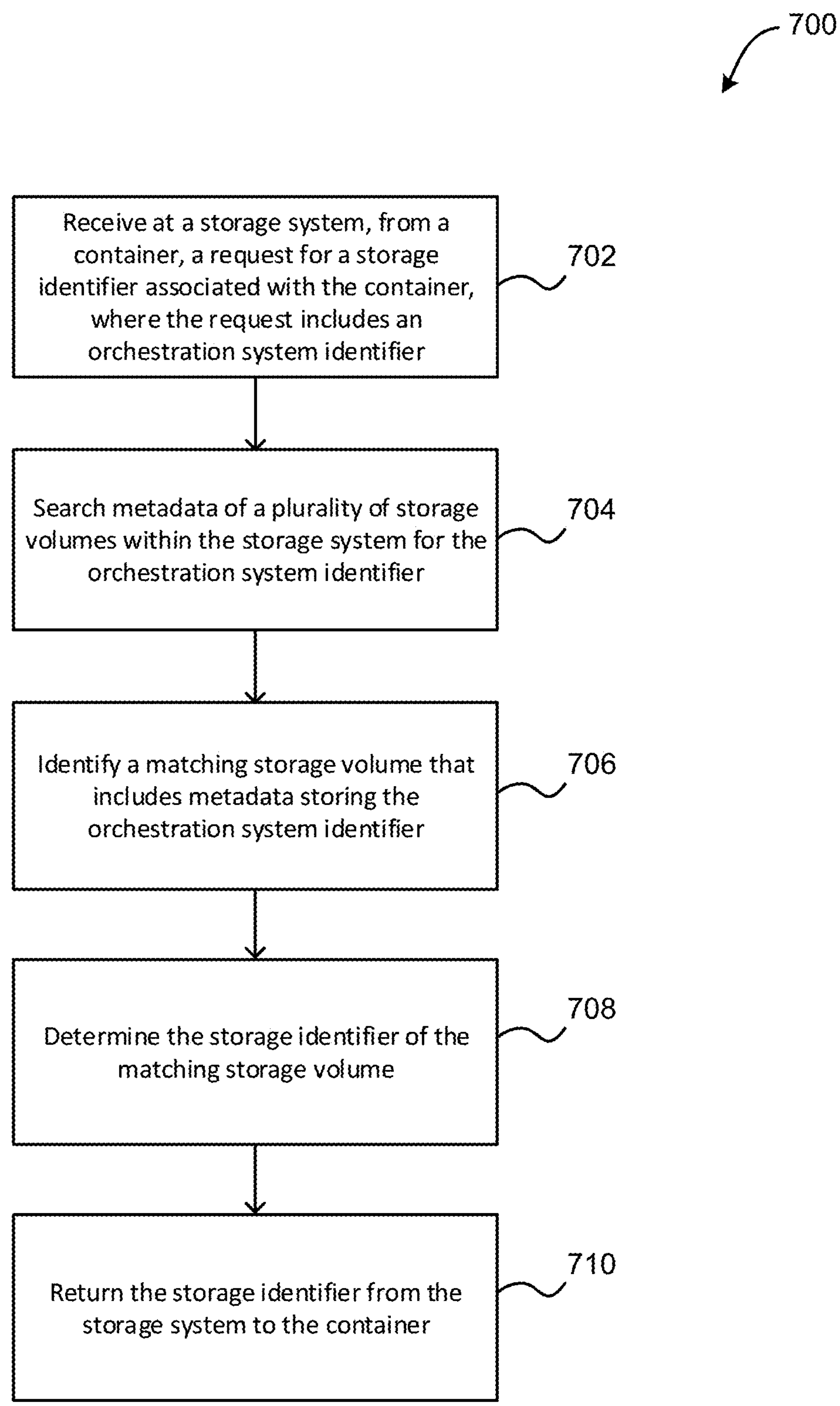
FIG. 7 illustrates a flowchart of a method for retrieving storage identifier data via storage volume metadata, in accordance with one embodiment.

Now referring to FIG. 7, a flowchart of a method 700 for retrieving storage identifier data via storage volume metadata is shown according to one embodiment. The method 700 may be performed in accordance with the present invention in any of the environments depicted in FIGS. 1-4 and 8-9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a request for a storage identifier associated with a container is received from the container at a storage system, where the request includes the orchestration system identifier. In one embodiment, the container may be located within an orchestration system.

Additionally, method 700 may proceed with operation 704, where metadata of a plurality of storage volumes is searched within the storage system for the orchestration system identifier. In one embodiment, a predetermined portion of each of the plurality of storage volumes may include metadata storage. In another embodiment, the metadata storage for a storage volume may include an orchestration system identifier if the storage volume currently stores persistent data associated with a specific storage claim used within the orchestration system (e.g., by one or more applications within one or more containers of the orchestration system, etc.).

Further, method 700 may proceed with operation 706, where a matching storage volume is identified that includes metadata storing the orchestration system identifier. In one embodiment, the metadata storage of each of the storage volumes may be scanned/searched until the orchestration system identifier is found within the metadata storage of one of the storage volumes.

Further still, method 700 may proceed with operation 708, where the storage identifier of the matching storage volume is identified. In one embodiment, the storage identifier may be stored within metadata of the matching storage volume.

Also, method 700 may proceed with operation 710, where the storage identifier is returned from the storage system to the container. In one embodiment, the requesting container may use the storage identifier to match the storage volume to the orchestration system identifier used by the container within the orchestration system. In another embodiment, the storage identifier may be used by the requesting container to retrieve persistently stored data from the storage volume of the storage system.

Also, in one embodiment, the storage volume may be identified and accessed, utilizing the storage identifier. In another embodiment, the persistently stored data may be requested from the identified storage volume, utilizing the storage identifier. In yet another embodiment, the persistently stored data may be returned to the container of the orchestration system.

Figure 8:
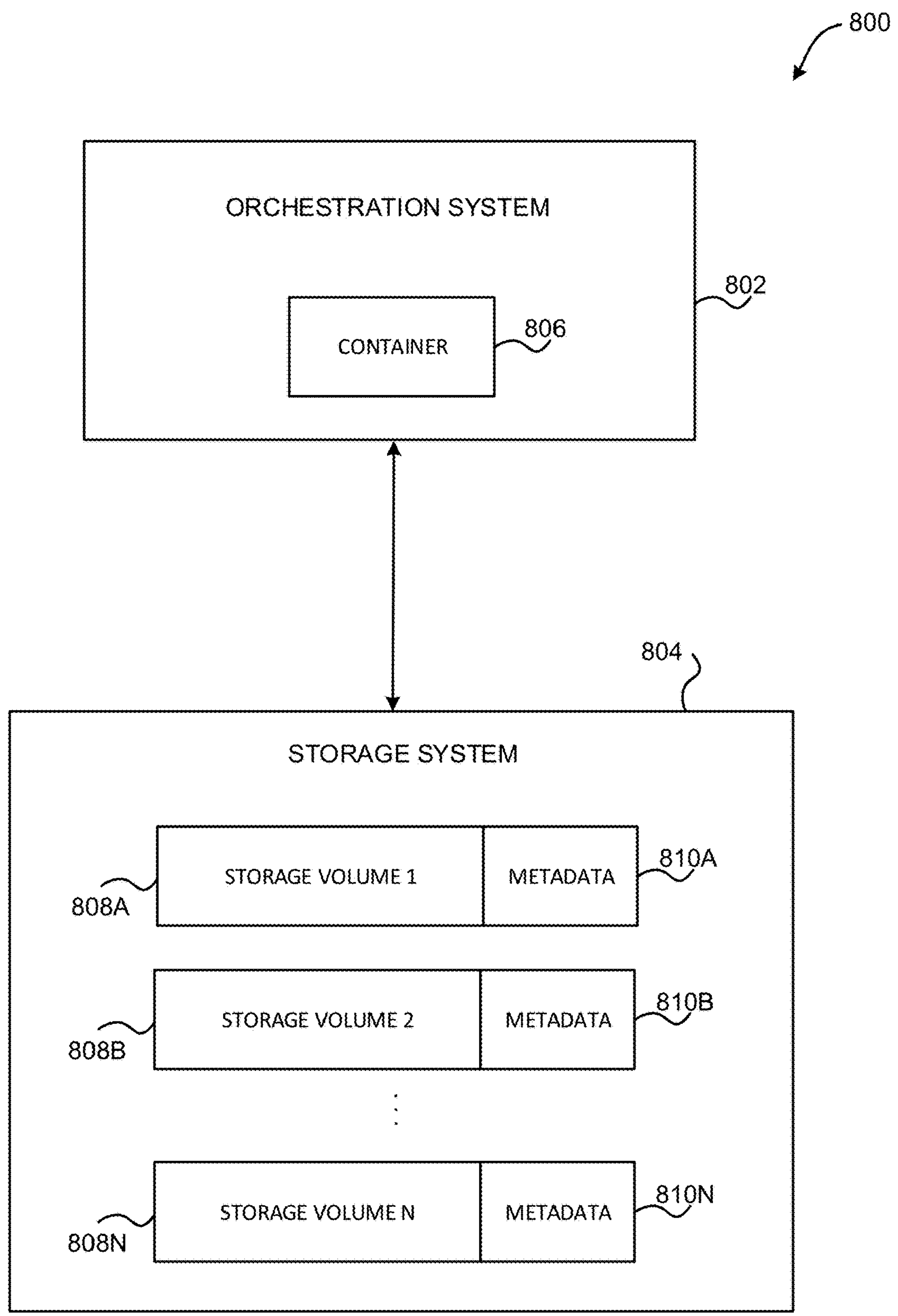
FIG. 8 illustrates an exemplary relationship between an orchestration system and a storage system implementing identifier storage in metadata, in accordance with one embodiment.

FIG. 8 illustrates an exemplary relationship 800 between an orchestration system 802 and a storage system 804 implementing identifier storage in metadata 810A-N, according to one embodiment. As shown, a container 806 is implemented within the orchestration system 802. In one embodiment, the container 806 may issue a request for persistent storage for use by the container 806. In response to the request, an orchestration system identifier may be created within the container 806.

Additionally, in one embodiment, the request and the orchestration system identifier may be sent from the orchestration system 802 to the storage system 804. In response to receiving the request, the storage system 804 may select a storage volume 808A within the storage system 804 for use by the container 806. In one embodiment, the storage volume 808A may be selected based on an availability of one or more storage volumes 808A-N within the storage system 804. In another embodiment, a storage identifier for the selected storage volume 808A may be determined by the storage system 804 and returned to the container 806.

Further, in one embodiment, the storage system 804 may store the orchestration system identifier for the container 806 in metadata 810A of the selected storage volume 808A. In another embodiment, the selected storage volume 808A may be used as persistent storage by the container 806. For example, the container 806 may create and store data at the selected storage volume 808A by sending a write request to the storage system 804, where the write request includes the storage identifier for the selected storage volume 808A.

The storage system 804 may receive the write request, and access the selected storage volume 808A based on the storage identifier received from the container 806. The selected storage volume 808A may then be used by the storage system 804 to store the data associated with the write request.

Further still, in one embodiment, the container 806 may be terminated within the orchestration system 802, and may later be restarted within the orchestration system 802. In response to its restarting, the container 806 may send a request for the storage identifier for the selected storage volume 808A to the storage system 804, where the request includes the orchestration system identifier for the container 806.

The storage system 804 may receive the request, and may search the metadata 810A-N of the storage volumes 808A-N for the orchestration system identifier within the request for the storage identifier. The orchestration system identifier may be identified within the metadata 810A of the selected storage volume 808A, and the storage identifier of the selected storage volume 808A may be returned from the selected storage volume 808A to the container 806.

Also, in one embodiment, the container 806 may then access the selected storage volume 808A utilizing the received storage identifier. For example, the container 806 may access the selected storage volume 808A to store additional persistent data, retrieve, access, or delete persistent data stored within the selected storage volume 808A, etc.

In this way, the container 806 may utilize the selected storage volume 808A as persistent storage, and the metadata 810A of the selected storage volume 808A may persistently store the orchestration system identifier for the container 806. As a result, the container 806 may not need to store or manage a storage identifier for the selected storage volume 808A, which may result in an improved performance of the container 806. Additionally, the storage system 804 may be able to directly identify the selected storage volume 808A as the storage volume associated with the container 806, which may improve a performance of the storage system 804.

Figure 9:
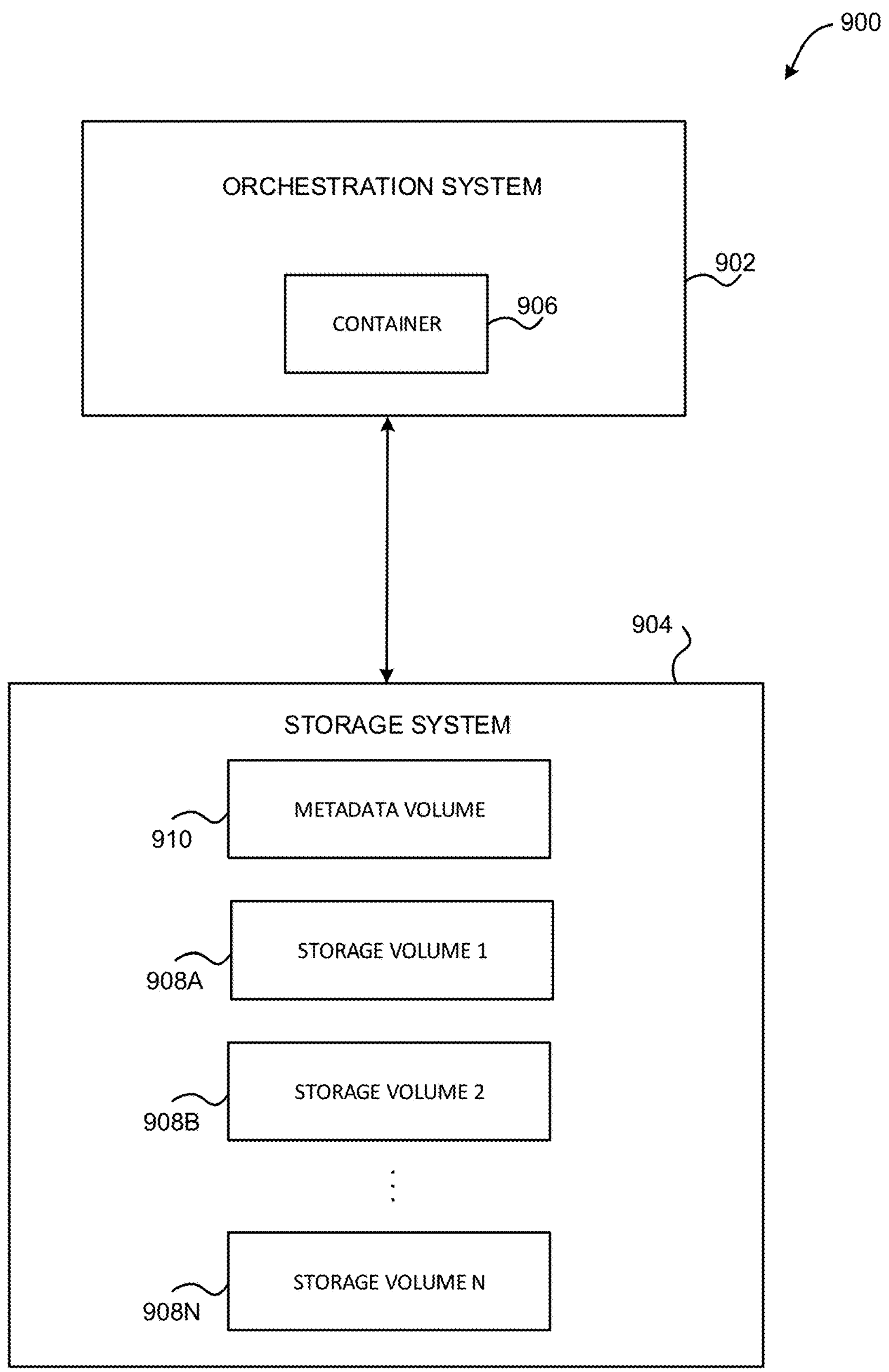
FIG. 9 illustrates an exemplary relationship between an orchestration system and a storage system implementing a mapping between orchestration system identifiers and storage identifiers that is stored in a dedicated metadata volume, in accordance with one embodiment.

FIG. 9 illustrates an exemplary relationship 900 between an orchestration system 902 and a storage system 904 implementing a mapping between orchestration system identifiers and storage identifiers that is stored in a dedicated metadata volume 910, according to one embodiment. As shown, a container 906 is implemented within the orchestration system 902. In one embodiment, the container 906 may issue a request for persistent storage for use by the container 906. In response to the request, an orchestration system identifier may be created within the container 906.

Additionally, in one embodiment, the request and the orchestration system identifier may be sent from the orchestration system 902 to the storage system 904. In response to receiving the request, the storage system 904 may select a storage volume 908A within the storage system 904 for use by the container 906. In one embodiment, the storage volume 908A may be selected based on an availability of one or more storage volumes 908A-N within the storage system 904. In another embodiment, a storage identifier for the selected storage volume 908A may be determined by the storage system 904 and returned to the container 906.

Further, in one embodiment, the storage system 904 may store a mapping between the storage identifier for the container 906 and the received orchestration system identifier within a table stored at a dedicated metadata volume 910. In another embodiment, the selected storage volume 908A may be used as persistent storage by the container 906. For example, the container 906 may create and store data at the selected storage volume 908A by sending a write request to the storage system 904, where the write request includes the storage identifier for the selected storage volume 908A.

The storage system 904 may receive the write request, and access the selected storage volume 908A based on the storage identifier received from the container 906. The selected storage volume 908A may then be used by the storage system 904 to store the data associated with the write request.

Further still, in one embodiment, the container 906 may be terminated within the orchestration system 902, and may lose all non-persistent data associated with the container 906. The container 906 may later be restarted within the orchestration system 902. In response to its restarting, the container 906 may send a request for the storage identifier for the selected storage volume 908A to the storage system 904, where the request includes the orchestration system identifier for the container 906.

The storage system 904 may receive the read request, and may search the table of the dedicated metadata volume 910 for the orchestration system identifier within the request for the storage identifier. The orchestration system identifier may be identified within the table of the dedicated metadata volume 910, and the storage identifier of the selected storage volume 908A may be identified based on its mapping to the orchestration system identifier. The storage identifier may then be returned from the storage system 904 to the container 906.

Also, in one embodiment, the container 906 may then access the selected storage volume 908A utilizing the received storage identifier. For example, after being restarted, the container 906 may access the selected storage volume 908A to store additional data, retrieve, access, or delete persistent data stored within the selected storage volume 908A, etc.

In this way, the container 906 may utilize the selected storage volume 908A as persistent storage, and the mapping between the storage identifier for the container 906 and the received orchestration system identifier may be persistently stored at the dedicated metadata volume 910. As a result, the container 906 may not need to store or manage a storage identifier for the selected storage volume 908A, which may result in an improved performance of the container 906. Additionally, the storage system 904 may be able to directly identify the selected storage volume 908A as the storage volume associated with the container 906 by referencing the dedicated metadata volume 910, which may improve a lookup performance of the storage system 904.

Maintaining Container to Storage Volume Relations

Introduction

In order to keep persistent data associated with a container, there is a need to translate a persistent storage volume from the way the container sees it ("Persistent Volume Claim", or PVC) and its actual identification in the storage system (e.g., a WWN (World Wide Name), etc.).

Summary

Relying on the storage system's resiliency, the storage system may be used in order to keep the mapping between the PVC and the volume's WWN persistently, either by keeping this mapping on the volume itself or in a designated volume in the storage system, that keeps mapping of all the container-provisioned volumes.

Details

The mapping between the PVC and the WWN may be kept in a persistent manner. Relying on the storage system persistency, and subsequent resiliency of its volumes, this mapping can be kept at the storage volume level.

When a container crashes and restarts (whether on the same node or another node), it may access the storage system and request this mapping—in advance, to have it cached for prompt access, or on demand, when needing to match a PVC with a storage volume.

One option is to have each volume keep its related PVC in the metadata stored on the volume itself. This requires going over the list of volumes on the storage and inquiring for the information. Another option is to use a designated "metadata volume" in the storage system, one that can be replicated or have another persistency or disaster recovery strategy applied to it. This designated metadata volume may keep all mappings of PVCs to WWNs, and vice versa.

An advantage of having a single volume keeping all mapping information is a simpler inquiry of the container volumes, and finding a volume relating to a PVC in a faster and simpler manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:

receiving, at a storage system, a request to allocate persistent data storage for use by a container within an orchestration system, where the request includes an orchestration system identifier;

selecting a storage volume within the storage system for use by the container within the orchestration system;

determining a storage identifier for the storage volume within the storage system, the storage identifier including a world wide name (WWN) or world wide identifier (WWID) that enables direct access of predetermined persistent data storage of the storage volume; and storing, within a predetermined storage volume of the storage system, an association between the orchestration system identifier and the storage identifier, where the predetermined storage volume is selected by the storage system to act as a central repository.

2. The computer-implemented method of claim 1, wherein the storage system includes a distributed storage environment.

3. The computer-implemented method of claim 1, wherein the orchestration system includes a plurality of nodes that are used to implement containers.

4. The computer-implemented method of claim 1, wherein the orchestration system identifier includes an identifier of a persistent volume claim made by the container.

5. The computer-implemented method of claim 1, wherein the orchestration system, which includes a plurality of nodes used to implement containers, and which is implemented within a cloud computing environment, is separate from the storage system, which includes a distributed storage environment with a plurality of storage drives.

6. The computer-implemented method of claim 1, wherein the storage identifier is automatically determined by the storage system in response to a selection of the storage volume by the storage system.

7. The computer-implemented method of claim 1, wherein the association between the orchestration system identifier and the storage identifier is stored as a mapping.

8. The computer-implemented method of claim 1, wherein the orchestration system identifier is stored as metadata within a predetermined portion of the storage volume.

9. The computer-implemented method of claim 1, further comprising:

receiving at the storage system, from the container, a request for the storage identifier associated with the container, where the request includes the orchestration system identifier;

identifying a predetermined storage volume within the storage system that contains a plurality of mappings between orchestration system identifiers and storage identifiers;

determining the storage identifier associated with the orchestration system identifier, utilizing the plurality of mappings; and returning the storage identifier from the storage system to the container.

10. The computer-implemented method of claim 1, further comprising:

receiving at the storage system, from the container, a request for the storage identifier associated with the container, where the request includes the orchestration system identifier;

searching metadata of a plurality of storage volumes within the storage system for the orchestration system identifier;

identifying a matching storage volume that includes metadata storing the orchestration system identifier;

determining the storage identifier of the matching storage volume; and returning the storage identifier from the storage system to the container.

11. A computer program product for maintaining container to storage volume relations, the computer program product comprising a computer readable storage medium having program instructions embodied therewith, wherein the computer readable storage medium is not a transitory signal per se, the program instructions executable by a processor to cause the processor to perform a method comprising:

receiving, utilizing the processor at a storage system, a request to allocate persistent data storage for use by a container within an orchestration system, where the request includes an orchestration system identifier;

selecting, utilizing the processor, a storage volume within the storage system for use by the container within the orchestration system;

determining, utilizing the processor, a storage identifier for the storage volume within the storage system, the storage identifier including a world wide name (WWN) or world wide identifier (WWID) that enables direct access of predetermined persistent data storage of the storage volume; and storing, within a predetermined storage volume of the storage system, an association between the orchestration system identifier and the storage identifier, utilizing the processor, where the predetermined storage volume is selected by the storage system to act as a central repository.

12. The computer program product of claim 11, wherein the storage system includes a distributed storage environment.

13. The computer program product of claim 11, wherein the orchestration system includes a plurality of nodes that are used to implement containers.

14. The computer program product of claim 11, wherein the orchestration system identifier includes an identifier of a persistent volume claim made by the container.

15. The computer program product of claim 11, wherein the orchestration system, which includes a plurality of nodes used to implement containers, and which is implemented within a cloud computing environment, is separate from the storage system, which includes a distributed storage environment with a plurality of storage drives.

16. The computer program product of claim 11, wherein the storage identifier is automatically determined by the storage system in response to a selection of the storage volume by the storage system.

17. The computer program product of claim 11, wherein the association between the orchestration system identifier and the storage identifier is stored as a mapping.

18. A system, comprising:

a processor; and logic integrated with the processor, executable by the processor, or integrated with and executable by the processor, the logic being configured to:

receive, at a storage system, a request to allocate persistent data storage for use by a container within an orchestration system, where the request includes an orchestration system identifier;

select a storage volume within the storage system for use by the container within the orchestration system;

determine a storage identifier for the storage volume within the storage system, the storage identifier including a world wide name (WWN) or world wide identifier (WWID) that enables direct access of predetermined persistent data storage of the storage volume; and store, within a predetermined storage volume of the storage system, an association between the orchestration system identifier and the storage identifier, where the predetermined storage volume is selected by the storage system to act as a central repository.

* * * * *